United States Patent

Cheng

[11] Patent Number: 5,961,148
[45] Date of Patent: Oct. 5, 1999

[54] SPLASHY-WATER REMOVING APPARATUS FOR VEHICLE WHEELS

[76] Inventor: Wen-Kuei Cheng, P.O. Box 55-846, Taipei, Taiwan

[21] Appl. No.: 08/870,017

[22] Filed: Jun. 5, 1997

[51] Int. Cl.[6] .................................................. B62B 9/16
[52] U.S. Cl. .......................................... 280/851; 280/848
[58] Field of Search ................................... 280/851, 850, 280/849, 848

[56] References Cited

U.S. PATENT DOCUMENTS

| | | | |
|---|---|---|---|
| 3,341,222 | 9/1967 | Roberts | 280/851 |
| 4,205,861 | 6/1980 | Roberts et al. | 280/851 |
| 4,290,619 | 9/1981 | Goodall | 280/851 |
| 5,299,831 | 4/1994 | Schmidt | 280/851 |

FOREIGN PATENT DOCUMENTS 2675108  10/1992  France ................................. 280/851
3939937  2/1991  Germany ............................. 280/851

*Primary Examiner*—J. J. Swann
*Assistant Examiner*—Michael Cuff

[57] ABSTRACT

A splashy-water removing apparatus for vehicle wheels including a plurality of water removing units mounted on a vehicle to be disposed around each vehicle wheel, each water removing unit having a plurality of energy-eliminating strips arcuately juxtapositionally secured in a casing arcuately disposing about each wheel for eliminating the dynamic energy of the water droplets as centrifugally thrusted by a rotating wheel and for collecting the droplets entering the water removing unit, and a water discharge system fluidically connecting all the water removing units, whereby upon running of a vehicle on a rainy road at high speed, the splashy water as thrusted from each wheel will be deactivated and collected in the water removing units and then drained rearwardly through the water discharge system for preventing the formation of water fog for preventing unclear vision for a rear vehicle.

11 Claims, 4 Drawing Sheets

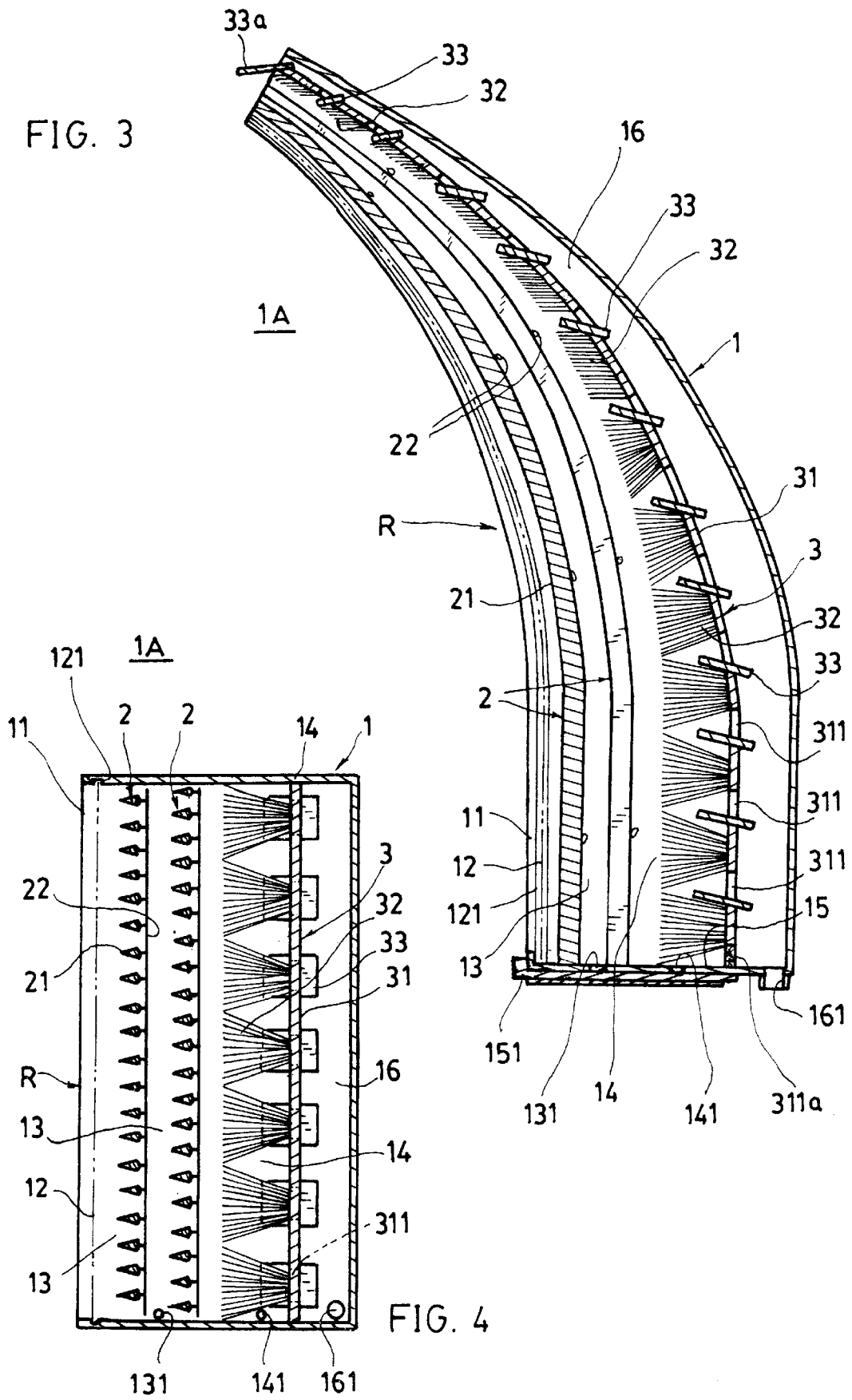

SPLASHY-WATER REMOVING APPARATUS FOR VEHICLE WHEELS

BACKGROUND OF THE INVENTION

A conventional splash guard is provided for shielding the water droplets as thrusted from a car wheel running on a rainy road. However, the water droplets impacted on the splash guard will be reflected downwardly to the tire and the road to be scattered into fine water mists or fog which will be further spread or diffused when encountering the eddy flows of air passing through a high-speed car, thereby easily obstructing a vision for a rear car and greatly influencing the traffic safety.

The present inventor has found the drawbacks of a conventional splash guard and invented the present water removing apparatus for a vehicle driving in a rainy day.

SUMMARY OF THE INVENTION

The object of the present invention is to provide a splashy-water removing apparatus for vehicle wheels including: a plurality of water removing units mounted on a vehicle to be disposed around each vehicle wheel, each water removing unit having a plurality of energy-eliminating strips arcuately juxtapositionally secured in a casing arcuately disposing about each wheel for eliminating the dynamic energy of the water droplets as centrifugally thrusted by a rotating wheel and for collecting the droplets entering the water removing unit, and a water discharge system fluidically connecting all the water removing units, whereby upon running of a vehicle on a rainy road at high speed, the splashy water as thrusted from each wheel will be deactivated and collected in the water removing units and then drained rearwardly through the water discharge system for preventing the formation of water fog for preventing unclear vision for a rear vehicle.

BRIEF DESCRIPTION OF THE DRAWINGS

FIG. 3 is a longitudinal sectional drawing of a rear section of the water removing unit in accordance with the present invention.

FIG. 4 is a cross sectional drawing of the present invention as shown in FIG. 3.

DETAILED DESCRIPTION

Figure 1:
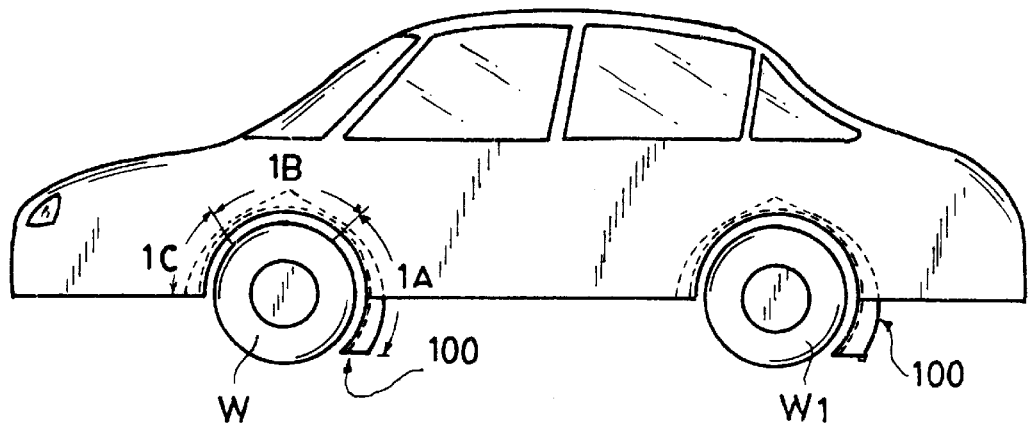
FIG. 1 is an elevational view of the present invention when mounted on a car.

As shown in FIGS. 1–6, a preferred embodiment of the splasy-water removing apparatus for vehicle wheels of the present invention comprises: a plurality of water removing units 100 respectively disposed around a pair of front wheels W and a pair of rear wheels Wi; and a water discharge system 200 fluidically communicated with the water removing units 100.

Each water removing unit 100 includes: a casing 1 having a longitudinal section of arcuate shape to dispose around a wheel W or W1 of a vehicle and having a cross section of general U shape having a width generally equal to a width of the wheel W, W1; and at least an energy-eliminating means 2, 2a, 3 arcuately secured in the casing 1 to circumferentially surround a tire of the wheel W, W1 for dampening rain-water droplets thrusted into the casing 1 for eliminating the dynamic energy stored in the rain-water droplets for collecting the rainwater in the casing 1 for a rearward discharge of the rainwater.

The water removing unit 100 includes: a rear section 1A, a middle section 1B and a front section 1C respectively corresponding to a rear wheel portion, a middle wheel portion and a front wheel portion of a wheel.

Although the drawing figures show the uses of this invention on a car, the present invention may also be used on motorcycles or other kinds of vehicle, not limited. The shapes, number, materials and detailed structures of the energy-eliminating means 2, 2a, 3 are also not limited in the present invention.

The rear section 1A of the water removing unit 100 includes: a casing 1 having an opening 11 formed in a first portion of the casing adjacent to the wheel W, W1 and operatively closed by a door 12, a first dampening chamber 13 formed in the casing 1 contiguous to the opening 11, a second dampening chamber 14 contiguous to the first dampening chamber 13 and formed in the casing 1, a bottom 15 formed on a bottom portion of the casing 1, and a back channel 16 arcuately formed in a second portion of the casing 1 opposite to the opening 11; a plurality of (or two) primary energy-eliminating means 2 concentrically arcuately formed in the first dampening chamber 13 within the casing 1 about a wheel center (not shown) of the wheel, each primary energy-eliminating means 2 having a plurality of blades 21 juxtapositionally arcuately secured in the first dampening chamber 13 for eliminating the energy of water droplets such as eliminated by friction loss on the blades, with at least a connecting bar 22 transversely connecting the blades 21 for stably fixing the blades 21 in the casing 1; and a secondary energy-eliminating means 3 concentrically arcuately formed in the second dampening chamber 14 in the casing 1 about the wheel center, having at least a base plate 31 arcuately formed in the casing 1 between the second dampening chamber 14 and the back channel 16, a plurality of water collectors 32 juxtapositionally secured on the base plate 31 to face the opening 11 for catching and collecting rainwater droplets entering the casing through the primary energy-eliminating means 2 when thrusted by the wheel on a rainy road, and a plurality of drainage plates 33 each drainage plate 33 inclinedly formed on the base plate 31 for gravitationally guiding the rainwater from the collector 32 through each drain opening 311 formed in the base plate 31 into the back channel 16 to be discharged from a drain outlet 161 formed in a bottom portion of the back channel 16.

Each blade 21 may have a cross section of arrow-head or ratchet-tooth shape tapered towards the opening 11 for easily directing the rainwater into the casing, but to minimize the reversible streamflow of rainwater and sludge laden thereon to be backwardly returned to the wheel tire.

The bottom 15 is formed with two bottom drain holes 131, 141 in the first and second dampening chambers 13, 14 for draining sludge or dirts as settled in the dampening chambers 13, 14 when opening a sliding valve 151 slidably mounted on the bottom 15 of the casing 1.

The lowest drain opening 311a formed in the lowest portion of the base plate 31 is fixed with a filter or net to prevent the entrance of sludge or dirts into the back channel 16 to prevent discharge of the sludge or dirts to the road to prevent pollution.

Each water collector 32 includes a plurality of bristles inclinedly secured to the base plate 31 and protruding towards the opening 11 for catching the rainwater droplets R thrusted into the casing 1 to be drained into back channel 16 through the drainage plates 33 each formed below each collector 32.

The uppermost drainage plate 33a is provided to receive the rain water as drained from the middle section 1B of the water removing unit 100.

The front section 1C is opposite to and separated from the rear section 1A by the middle section 1B of the water removing unit 100. The front section 1C has a structure similar to that of the rear section 1A, but shorter than the rear section 1A.

Each section 1A, 1B, 1C has an opening 11 formed in the casing for providing a door 12 for closing the opening 11. The door 12 may be a flexible sliding door slidably engageable with a groove 121 disposed about the opening 11 having a reel 120 which may rewind the flexible sliding door into the reel 120 by a driving motor when opening the door 12 in a rainy day. The reel 120 may be provided with cleaner for cleaning the flexible door as wound or unwound in the reel.

The door 12 may also be substituted with louvers (not shown) which may be manually or electrically opened or closed. The door 12 may be normally closed is a fine day to preclude the entrance of dusts or dirts into the casing as thrusted by the rotating wheels; and opened in rainy day especially when the car is running at high speed.

Figure 5:
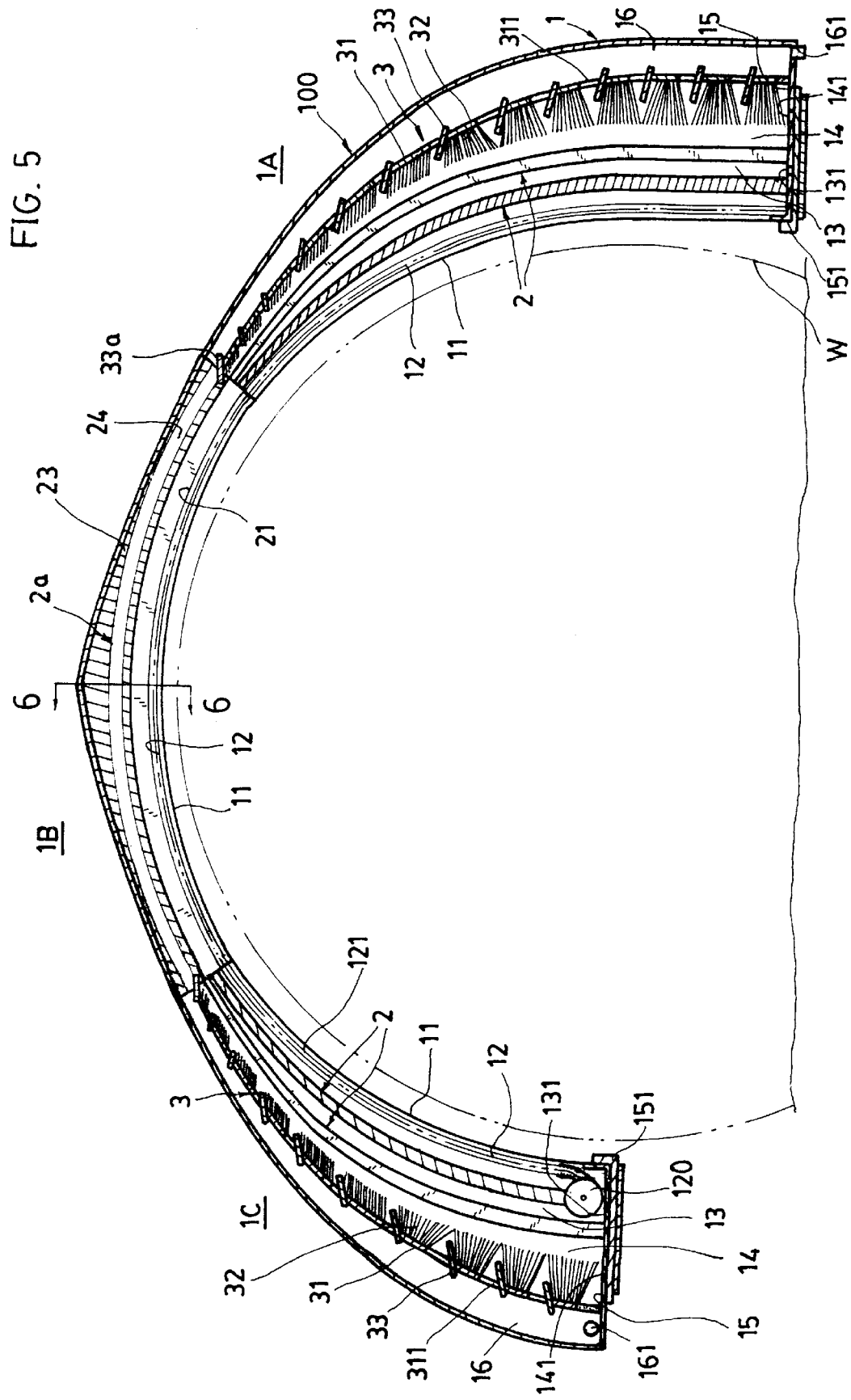
FIG. 5 is a sectional drawing of the water removing unit of the present invention.
Figure 6:
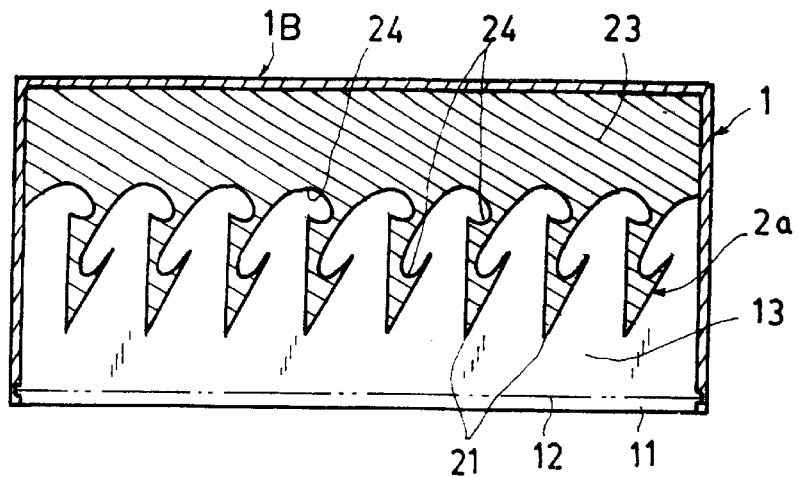
FIG. 6 is a cross sectional drawing of a top energy eliminating means of the present invention when viewed from 6—6 direction of FIG. 5.

The middle section 1B of the water removing unit 100 as shown in FIGS. 5, 6 includes: a casing 1 having an opening 11 formed in a lower edge portion of the casing 1 adjacent to the wheel W, W1, a dampening chamber 13 contiguous to the opening 11 for encasing a top energy-eliminating means 2a in the dampening chamber 13; and the top energy-eliminating means 2a arcuately positioned above the wheel W, W1 and including: a plurality of blades 21 integrally and juxtapositionally formed on a holding base 23 fixed in a back portion of the casing 1 with each blade 21 tapered downwardly from the holding base 23 to define a trapping groove 24 recessed in the holding base 23 between every two neighboring blades 21, with the trapping groove 24 arcuately formed in the base 23 for trapping the rainwater in the grooves 24 to be gravitationally drained through the drainage plate 33a, connectable with the trapping grooves 24, into the back channel 16 of the front section 1C and rear section 1A of the water removing unit 100 for discharging the rainwater outwardly.

Naturally, at least one primary energy-eliminating means 2 as provided in the rear section 1A may also be provided in the dampening chamber in the middle section 1B just adjacent to the opening 11.

Figure 7:
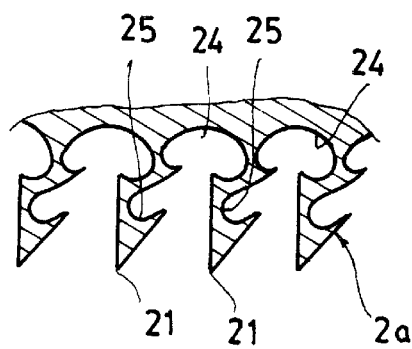
FIG. 7 shows another preferred embodiment of the energy-eliminating means as modified from FIG. 6.

Between every two blades 21 of the top energy-eliminating means 2a, there may be two or plural trapping grooves 24, 25 as shown in FIG. 7 to efficiently trap and collect the rainwater when upwardly thrusted by the rotating wheels W, W1.

Figure 8:
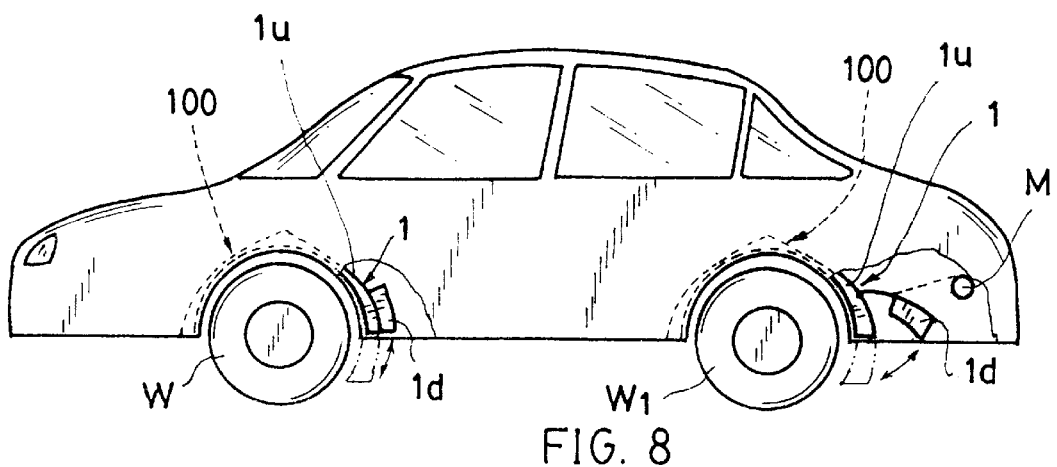
FIG. 8 shows a telescopic water removing unit of the present invention when telescopically mounted on the car.

As shown in FIG. 8, the rear section 1A of each water removing unit 100 includes an upper portion 1u and a lower portion 1d telescopically or hingedly connected to the upper portion 1u, with the lower portion 1d normally retracted in the vehicle bottom to prevent damage when impacted by external stones or articles on a corrugated road and operatively lowered (such as by a driving motor M) when actuating the wind-shield wiper in a rainy day and when the car speed is so high as exceeding a predetermined value by an electrical circuit, a control system or a manual operation.

Upon actuation of the wind-shield wiper in a rainy day and upon sensing of a higher speed, the door 12 may be automatically operated to disclose the opening 11 for receiving rainwater into the casing 1 and the lower portion 1d of each rear section 1A is simultaneously lowered for receiving the rainwater as centrifugally thrusted by the car wheels W, W1 rotating at a high speed.

Figure 2:
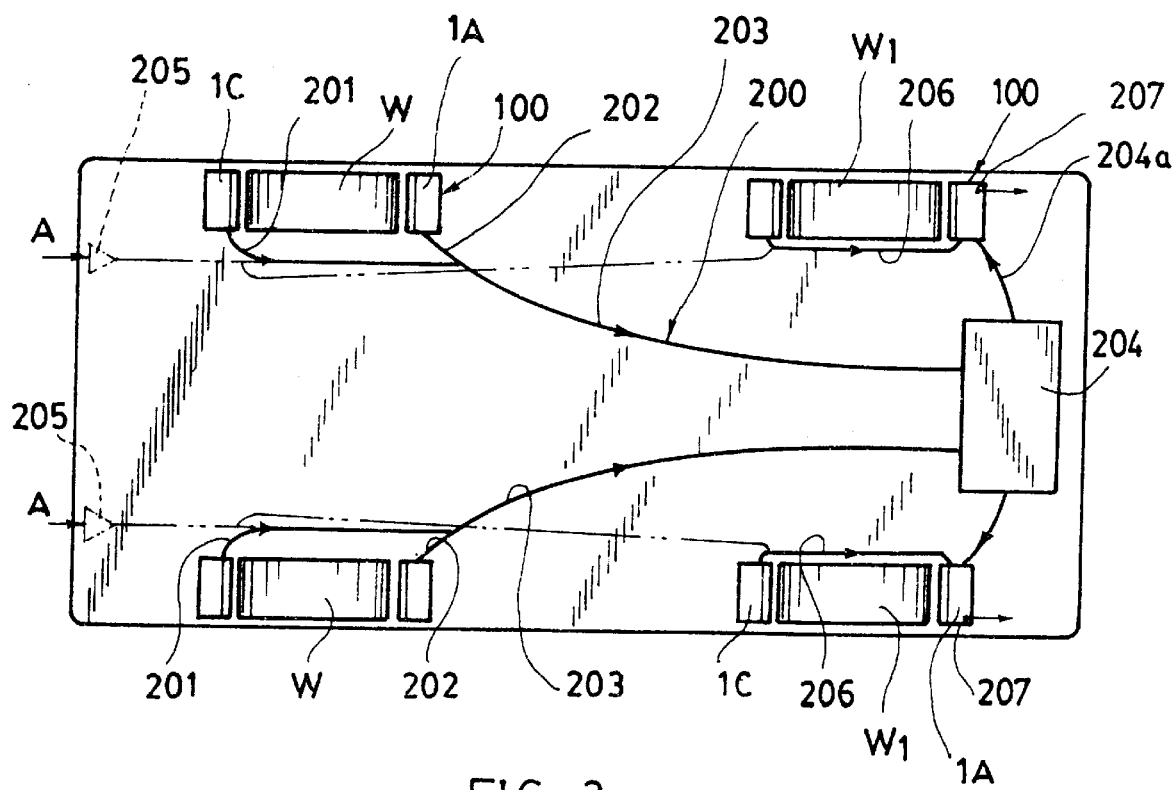
FIG. 2 is a bottom view thereof.

The water discharge system 200 of the present invention as shown in FIG. 2 includes: at least a front-wheel discharge pipe 203 connected to a first and a second connecting pipe 201, 202 respectively communicated with a front section 1c and a rear section 1A of each water removing unit 100 disposed around each front wheel W; an accumulating tank 204 secured in a rear portion of the vehicle (such as in a trunk) connected with the front-wheel discharge pipe 203 and connected through a drain pipe 204a with each rear section 1A of the water removing unit 100 disposed about each rear wheel W1 for draining rainwater onto the road after the rear wheels W1 through a drain hose 207 connected with the drain outlet 161 formed in a bottom portion of the back channel 16; and at least a rear-wheel discharge pipe 206 communicated between a front section 1c and a rear section 1A of each water removing unit 100 disposed about each rear wheel W1 for directing the rainwater in the front section 1c towards the rear section 1A for discharging the rainwater from the rear section 1A.

An air drafting pipe 205 connected to the front-wheel discharge pipe 203 and the rear-wheel discharge pipe 206 may be provided for sucking air A inwardly to draft the rainwater in the water removing units 100 by Bernoulli principle. Naturally, a pump may also be provided to pump the rainwater to be collected in the tank 204.

The present invention may eliminate or differentiate the dynamic energy existing in the rainwater droplets as centrifugally thrusted into the casing 1 by the energy-eliminating eliminating means 2, 2a, 3 to easily catch and collect the rainwater for a final discharge after the rear wheel W1 to minimize the rainwater reflected downwardly towards the wheels or the road surface to reduce the water resistance of a car for a smooth, safe driving in a rainy day, and also to prevent the formation of water fog since the droplets are caught, integrated and accumulated in the water tank for a gravitational drainage without causing spillage, thereby creating a clear vision for the rear car driver for enhancing traffic safety. Also, any road water for causing buoyancy of the car may be minimized by the present invention to prevent floating of car on the water to thereby shorten the braking distance when driving in a rainy day.

The present invention may be modified without departing from the spirit and scope of this invention. The energy-eliminating means 2, 2a, 3 may also be modified to be an arcuate strip, a bar, a rod, an elongated net or sponge-like member; not limited in the present invention.

I claim:

1. A splashy-water removing apparatus for vehicle wheels comprising:

a plurality of water removing units respectively disposed around at least a front wheel and at least a rear wheel for eliminating energy of rainwater entering said water removing units as thrusted by the vehicle wheels rotating in a rainy road and for collecting rainwater in said water removing units; and a water discharge system fluidically communicated with said plurality of water removing units for discharging rainwater collected in said water removing units towards a road surface after the rear wheel;

each said water removing unit including: a rear section corresponding to a rear wheel portion of the vehicle wheel, a front section opposite to the rear section and corresponding to a front wheel portion of the vehicle wheel, and a middle section between the front section and the rear section and corresponding to a middle wheel portion of the vehicle wheel; and each of said rear section and said front section of the water removing unit including: a casing having an opening formed in a first portion of the casing adjacent to the wheel and operatively closed by a door, a first dampening chamber formed in the casing contiguous to the opening, a second dampening chamber contiguous to the first dampening chamber and formed in the casing, a bottom formed on a bottom portion of the casing, and a back channel arcuately formed in a second portion of the casing opposite to the opening; a plurality of primary energy-eliminating means concentrically arcuately formed in the first dampening chamber within the casing about a wheel center of the wheel, each said primary energy-eliminating means having a plurality of blades juxtapositionally arcuately secured in the first dampening chamber, with at least a connecting bar transversely connecting the blades for stably fixing the blades in the casing; and a secondary energy-eliminating means concentrically arcuately formed in the second dampening chamber in the casing about the wheel center, having at least a base plate arcuately formed in the casing between the second dampening chamber and the back channel, a plurality of water collectors juxtapositionally secured on the base plate to face the opening for catching and collecting rainwater droplets entering the casing through the primary energy-eliminating means when thrusted by the wheel on a rainy road, and a plurality of drainage plates each inclinedly formed on the base plate for gravitationally guiding the rainwater from the collector into the back channel through a plurality of drain openings formed in the base plate to be discharged from a drain outlet formed in a bottom portion of the back channel.

2. A splashy-water removing apparatus according to claim 1, wherein each said blade has a cross section of ratchet-tooth shape tapered towards the opening for easily directing the rainwater into the casing.

3. A splashy-water removing apparatus according to claim 1, wherein said bottom of said casing has at least a drain hole formed in the first and second dampening chambers for draining sludge and dirts as settled in the dampening chambers when opening a sliding valve slidably mounted on the bottom of the casing.

4. A splashy-water removing apparatus according to claim 1, wherein the base plate has a lowest drain opening formed in a lowest portion of the base plate, with a filter fixed on said lowest drain opening to prevent the entrance of sludge and dirts into the back channel.

5. A splashy-water removing apparatus according to claim 1, wherein each said water collector includes a plurality of bristles secured to the base plate and protruding towards the opening for catching the rainwater droplets thrusted into the casing to be drained into the back channel through the drainage plates each formed below each said collector.

6. A splashy-water removing apparatus according to claim 1, wherein each said section has an opening formed in the casing and a door normally closing the opening and operatively opened in a rainy day.

7. A splashy-water removing apparatus according to claim 6, wherein said door is a flexible sliding door slidably engageable with a groove formed in the casing adjacent to the opening having a reel for rewinding the flexible sliding door into the reel when opening the door.

8. A splashy-water removing apparatus according to claim 1, wherein said middle section of the water removing unit includes: a casing having an opening formed in a lower edge portion of the casing adjacent to the wheel, a dampening chamber contiguous to the opening for encasing a top energy-eliminating means in the dampening chamber; and the top energy-eliminating means arcuately postioned above the wheel and including: a plurality of blades integrally and juxtapositionally formed on a holding base fixed in a back portion of the casing with each said blade tapered downwardly from the holding base having a trapping groove recessed in the holding base between every two neighboring blades, with the trapping groove arcuately formed in the base for trapping the rainwater in the grooves to be gravitationally drained through a drainage plate into a back channel of the front section and rear section of the water removing unit for discharging the rainwater outwardly.

9. A splashy-water removing apparatus according to claim 1, wherein said rear section of said water removing unit includes an upper portion and a lower portion telescopically connected each other, with the lower portion normally retracted in a vehicle bottom and operatively lowered when actuating a wind-shield wiper in a rainy day and when the car speed exceeding a predetermined value.

10. A splashy-water removing apparatus according to claim 1, wherein said water discharge system includes: at least a front-wheel discharge pipe connected to a first and a second connecting pipe respectively communicated with a front section and a rear section of each said water removing unit disposed around each front wheel; an accumulating tank secured in a rear portion of the vehicle connected with the front-wheel discharge pipe and connected through a drain pipe with each said rear section of the water removing unit disposed about each rear wheel for draining rainwater onto the road after the rear wheels through a drain hose connected with the drain outlet formed in a bottom portion of the casing; and at least a rear-wheel discharge pipe communicated between a front section and a rear section of each said water removing unit disposed about each rear wheel for directing the rainwater in the front section towards the rear section for discharging the rainwater from the rear section after the rear wheel.

11. A splashy-water removing apparatus according to claim 10, wherein said water discharge system has an air drafting pipe connected to the front-wheel and rear-wheel discharge pipes to suck air inwardly to draft the rainwater in the water removing unit rearwardly to discharge the rainwater.

* * * * *